United States Patent
Cohen (10) Patent No.: US 10,271,273 B2
(45) Date of Patent: Apr. 23, 2019

(54) RADIO RELAY ARCHITECTURE AND METHOD FOR POWER CONSERVATION UNDER DYNAMIC CHANNEL CONDITIONS

(71) Applicant: The United States of America, as represented by the Secretary of the Navy, Washington, DC (US)

(72) Inventor: Aaron E. Cohen, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 55 days.

(21) Appl. No.: 15/582,672

(22) Filed: Apr. 29, 2017

(65) Prior Publication Data

US 2017/0318525 A1 Nov. 2, 2017

Related U.S. Application Data

(60) Provisional application No. 62/329,399, filed on Apr. 29, 2016.

(51) Int. Cl.
*H04W 52/02* (2009.01)
*H04B 7/14* (2006.01)
*H04L 5/00* (2006.01)
*H04B 7/155* (2006.01)

(52) U.S. Cl.
CPC .......... *H04W 52/0203* (2013.01); *H04B 7/14* (2013.01); *H04B 7/15557* (2013.01); *H04L 5/006* (2013.01); *Y02D 70/00* (2018.01); *Y02D 70/446* (2018.01)

(58) Field of Classification Search
CPC ............ H04B 7/15592; H04B 7/15557; H04B 7/0632; H04B 7/14; H04L 5/006; Y02D 70/00; Y02D 70/446; H04W 52/0203
See application file for complete search history.

(56) References Cited

U.S. PATENT DOCUMENTS

| | | | | |
|---|---|---|---|---|
| 2004/0048589 | A1* | 3/2004 | Yamamoto | H04B 1/005 455/130 |
| 2004/0142716 | A1* | 7/2004 | Orlik | H04B 7/15557 455/522 |
| 2008/0171527 | A1* | 7/2008 | Masoian | H04B 7/15542 455/307 |
| 2011/0134772 | A1* | 6/2011 | Zhang | H04B 7/15542 370/252 |
| 2012/0155373 | A1* | 6/2012 | Yokomakura | H04L 1/0065 370/315 |

(Continued)

OTHER PUBLICATIONS

Thomas M. Cover and Abbas El Gamal, "Capacity theorems for the relay channel," IEEE Transactions on Information Theory (1979), pp. 572-584.

*Primary Examiner* — Ricardo H Castaneyra
(74) *Attorney, Agent, or Firm* — US Naval Research Laboratory; William P. Ladd (57) ABSTRACT

Systems and method are provided for dynamically adjusting relay methodology based on current radio frequency channel conditions by selecting an optimal relay method. Radio relay systems that can dynamically adapt their relay modes in accordance with embodiments of the present disclosure can achieve useful power savings over conventional relay systems designed for worst case scenario operation.

18 Claims, 3 Drawing Sheets

(56) References Cited

U.S. PATENT DOCUMENTS

2013/0003638 A1* 1/2013 Noh .................. H04W 72/1231
                                                         370/312
2015/0043423 A1* 2/2015 Hadef .................... H04B 7/14
                                                         370/315

* cited by examiner

RADIO RELAY ARCHITECTURE AND METHOD FOR POWER CONSERVATION UNDER DYNAMIC CHANNEL CONDITIONS

CROSS REFERENCE TO RELATED APPLICATIONS

This application claims the benefit of U.S. Provisional Patent Application No. 62/329,399, filed on Apr. 29, 2016, which is incorporated by reference herein in its entirety.

FIELD OF THE DISCLOSURE

This disclosure relates to radio communications, including radio relay communications.

BACKGROUND

Radio communications requirements can vary depending on the distance between a transmitter and a receiver and whether a receiver is within line of light (LOS) of a transmitter. Near line of sight and non line of sight (NLOS) conditions can occur when obstacles (e.g., trees) are between the transmitter and receiver. Beyond line of sight (BLOS) conditions can occur when terrain between a transmitter and receiver are very distant or very obscured.

To meet BLOS communications requirements while also meeting constraints on size, weight, and power (SWAP), one possible solution to mitigate against BLOS conditions is to employ a number of relays. Modern relay systems rely on architectures that understand modulated communications waveforms to translate between different modulated waveforms when relaying. Conventional relay systems are inefficient, unadaptable, and consume an undesirable amount of power.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Overview

Embodiments of the present disclosure provide systems and methods to select an optimal relay method based on given information about user/radios, radio frequency spectrum channel conditions, and waveforms. By using systems and methods according to embodiments of the present disclosure, power can be saved by monitoring the radio frequency spectrum and dynamically selecting an optimal relay method out of available relay methods given measured channel characteristics. Embodiments of the present disclosure can also take into account size, weight, and power (SWAP) platform requirements, dynamic channel conditions due to a dynamic relationship between transmitters, receivers, and relays, and situational requirements (e.g., determining the optimal relay method given two or more users that need a relay to communicate with one another and a selected waveform).

Embodiments of the present disclosure are able to achieve approximately 7.5 watt per relay node power savings for signal-to-noise ratio (SNR) challenged links (probability=⅓), adjacent interference links (probability=⅓), and 33% clear links (probability=⅓). In an embodiment, this is accomplished by dynamically adjusting the relay methodology between a low power amplify-and-forward (AF) relay method, a compress-and-forward (CF) relay method, and a power intensive decode-and-forward (DF) relay method.

2. Relay Methods

To meet BLOS communications requirements while also meeting constraints on size, weight, and power, one possible solution to mitigate against BLOS conditions is to employ a number of relays. Modern relay systems rely on architectures that understand modulated communications waveforms to translate between different modulated waveforms when relaying. Modern waveforms that are designed for interoperability allow relays to forgo the power intensive operations associated with decoding and re-encoding a waveform for retransmission known as decode and forward (DF) relaying. Two such relaying methods with less complexity are amplify-and-forward (AF) and compress- and forward (CF) relaying. Systems and methods according to embodiments of the present disclosure can combine all three of these methods and dynamically switch between them.

Many modern relays fall under two separate categories: queuing relays and memoryless relays. Embodiments of the present disclosure are primarily interested in low power memoryless relays that do not have the ability to queue packets. However, it should be understood that systems and methods in accordance with embodiments of the present disclosure can also be used for queuing relays. Memoryless relays fall into the following subgroups: (1) Amplify-and-Forward (AF) Relay Channel; (2) Compress-and-Forward (CF) Relay Channel; and (3) Decode-and-Forward (DF) Relay Channel.

In AF Relay Channel systems, the relay boosts the received signal and transmits the boosted signal to the output channel in the next timeslot. In an embodiment, the AF method requires significantly less computing power for modern waveforms, as no decoding operations are performed on the relay. In an embodiment, the AF Relay Channel method is the simplest method for relaying, as it provides a basic repeater capability without checking the source transmissions for signals. In an embodiment, it is best used when channel conditions are good (such as High SNR) and does not perform well with low SNR. Retransmission occupies the same bandwidth.

In CF Relay Channel systems, the relay compresses the received message signal in one block and transmits the compressed message signal to the output channel in the next block timestep. In an embodiment, the CF Relay Channel method reduces the occupied bandwidth of the retransmission. In an embodiment, it is best used when adjacent channel interference is a concern at the end user. It can reduce message frequency content with a low pass filter and/or reduce peak frequency deviation in an FM modulator.

In DF Relay Channel systems, the transmitted data is decoded to bits before retransmitting. For example, in an embodiment, the relay decodes the received signal to a bitstream block, optionally corrects for bit errors or noise in the decoded bitstream block, encodes the corrected bitstream block to an encoded signal, and transmits this encoded signal to the output channel in the next block timestep. In an embodiment, a decoder and encoder used in DF Relay Channel systems can use voice, cryptography, and/or error correction coding. In an embodiment, the DF Relay method is best used when the combination of channel errors from the uplink and downlink channels exceed the radio receiver's decoding capability. In an embodiment, the decoder has the ability to clean up the baseband data prior to retransmission such that final receiver will receive errors which correspond primarily to its link with the relay rather than a sum of two links (transmitter to relay and relay to receiver). In an embodiment, the additional computation in the decode and forward relay method adds both latency to the retransmission and requires additional power consumption and processing power in the relay.

Embodiments of the present disclosure provide systems and methods to select an optimal relay method based on given information about user/radios, radio frequency spectrum channel conditions, and waveforms. A group of selected and/or defined relays (e.g., using software or hardware) with the ability to dynamically adapt their relaying methods in accordance with embodiments of the present disclosure outperform a group of DF relays in terms of lower total power consumption.

3. Exemplary Radio Relay Implementation

An exemplary radio relay implementation will now be discussed with reference to the Military RT1439A radio. The Military RT1439A radio comprises FM voice and data communications. There are three separate voice transmission data paths, but all methods rely on the same upconversion and downconversion circuitry. This radio has external COMSEC and ECCM modules and can be used without these controlled devices or with proprietary replacements for these devices. The radio transmits a squelch tone at 150 Hz. The receiver uses the squelch tone to determine if an audio signal is present and to allow playback of the FM demodulated audio. Without this signal, received audio playback on the RTI439A will be clipped or muted.

The transmitter model comprises a squelch tone generator, microphone or audio file input, pre-emphasis, sample rate converters, FM modulator, and an SDR transmitter tuned to the carrier frequency. The amplitude of the 150 Hz squelch tone is set to achieve the ±3.5 kHz modulated signal as specified in the reference technical manual. The receiver model comprises the SDR Receiver tuned to the carrier frequency, FM demodulator, Deemphasis Filter, 1 in 5 Decimator, squelch control, volume control and audio output. The squelch control was implemented using a DIT method. The three methods that were tested include the Goertzel algorithm, a Sliding DFT, and a FIT operation with checking the appropriate frequency bin for 150 Hz. The bin number can be calculated as 150*(#FIT points)/(F.). The FIT implementation is not as efficient as using either the Goertzel algorithm for single tone detection or the sliding DIT algorithm because a majority of the FFT computation results are discarded. The sliding DIT requires more delays than Goertzel with one somewhat costly delay-by-N samples. Two variations of the FM demodulator were tested. The first one was the traditional angle modulation. The second one used an approximation and was implemented like a 2 tap filter.

The three types of memoryless relay methods implemented are AF, CF, and DF. The AF relay comprises primarily a downconverter and an upconverter. The downconverter is set to the received frequency, while the upconverter is set to the transmitted frequency. In general, AF relays are the most power efficient but suffer from less reliability because they forward both the desired signal and any additional received noise. The CF relay comprises the same components as the AF relay discussed above, along with a compression block. The compression block is implemented with a low pass filter (LPF) but can be implemented in different ways depending on the compression methodology. The LPF block is meant to reduce the highest frequencies in the message information. Based on Carson's bandwidth rules, reducing the message bandwidth reduces the overall bandwidth of the transmissions. The DF relay comprises the same components as the AF relay discussed above along with the decoder blocks. The decoder block comprises a Continuously Variable Slope Delta (CVSD) Modulation voice decoder, followed by a CVSD voice encoder. These blocks can be augmented with encryption and redundancy to improve the overall performance and security of such a relay method.

A comparison of these three relay methods in terms of processing blocks are presented in Table 1:

TABLE 1

Relay Signal path Processing Block Comparison for FM Modulation

|   | Amplify-and-Forward | Compress-and-Forward | Decode-and-Forward |
|---|---|---|---|
| 1 | SDR RX | SDR RX | SDR RX |
| 2 |  | FM DEMOD | FM DEMOD |
| 3 |  | DEMPHASIS | DEMPHASIS |
| 4 |  | DECIMATOR | DECIMATOR |
| 5 |  | Compress: Low Pass Filter | Decode: CVSD Decoder CVSD Encoder |
| 6 |  | INTERPOLATOR | INTERPOLATOR |
| 7 |  | PREMPHASIS | PREMPHASIS |
| 8 |  | FM MOD | FM MOD |
| 9 | SDR TX | SDR TX | SDR TX |

4. Exemplary Reconfigurable Relay Implementations

Figure 1:
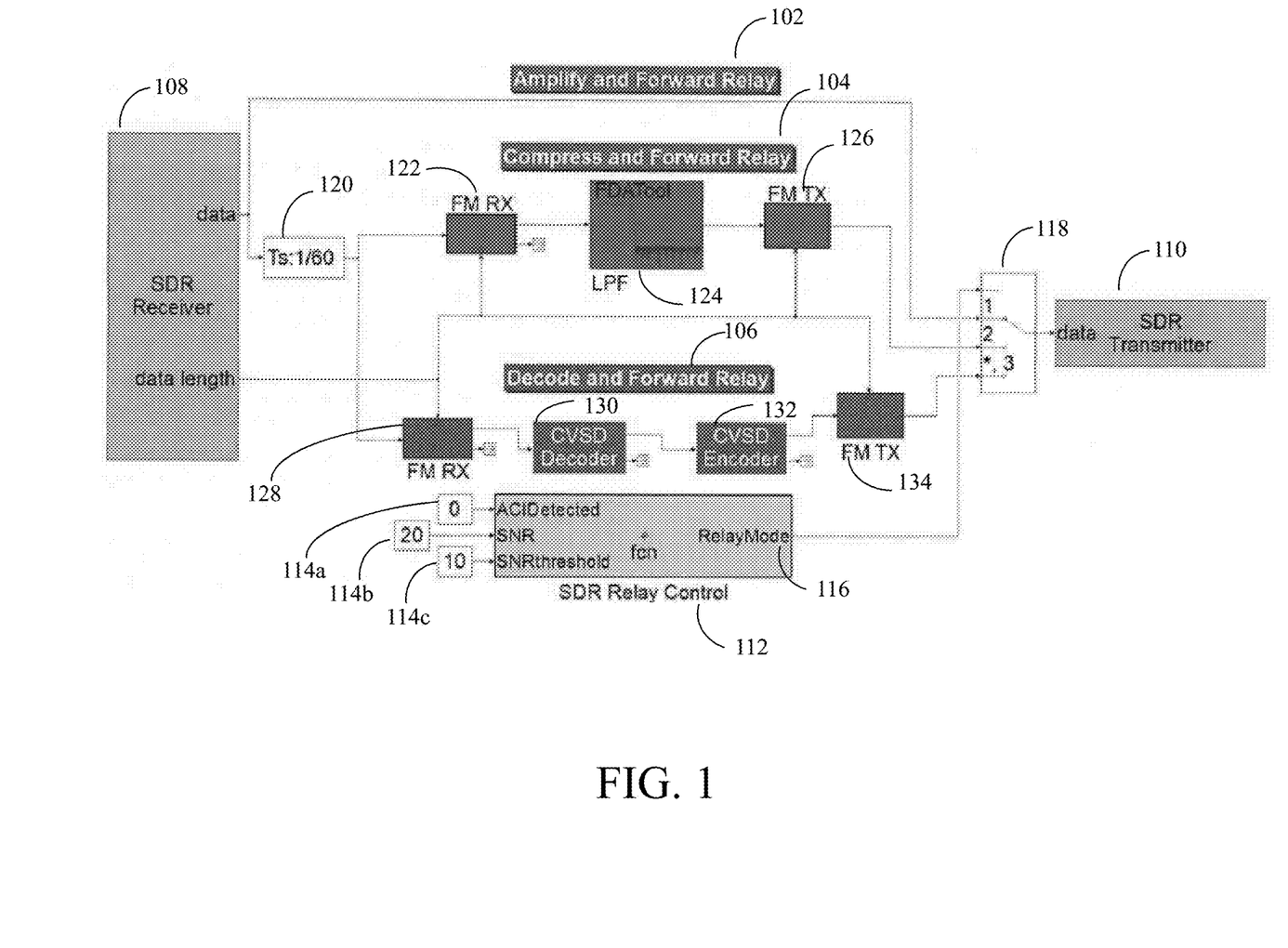
FIG. 1 shows a diagram of a relay system in accordance with embodiments of the present disclosure.

FIG. 1 shows an exemplary diagram of a relay system in accordance with embodiments of the present disclosure. While components of FIG. 1 are illustrated for an exemplary embodiment using frequency modulation (FM), it should be understood that embodiments of the present disclosure can use any other type of modulation including amplitude modulation, phase modulation, etc.

The relay system of FIG. 1 is capable of reconfiguring its relay channels to maximize power efficiency when channel conditions are optimal but can dynamically increase processing to operate in poor channel conditions. In an embodiment, to take advantage of the dynamic conditions found in the environment, multiple radio frequency (RF) parameters are measured so that each channel can be optimized based on the current RF environment.

The relay system of FIG. 1 includes an AF Relay module 102, a CF Relay module 104, and a DF Relay module 106. It should be understood, that, while one DF Relay module 106 is illustrated in FIG. 1, embodiments of the present disclosure can include multiple DF Relay modules (e.g., DF1, DF2, . . . DFn). In an embodiment, AF Relay module 102, CF Relay module 104, and DF Relay module 106 are each configured to receive data from a receiver 108 (e.g., an SDR receiver) and send it to a transmitter 110 (e.g., an SDR transmitter). In an embodiment, CF Relay module 104 and DF Relay Module 106 also include a frame processing module 120. Additionally, in an embodiment, CF Relay module 104 also includes demodulator 122 (e.g., an FM demodulator), low pass filter (LPF) 124, modulator 126 (e.g., an FM modulator). In an embodiment, DF Relay module 106 includes demodulator 128 (e.g., an FM demodulator), continuously variable slope delta (CVSD) decoder 130, CVSD encoder 132, and modulator 134 (e.g., an FM modulator).

In an embodiment, a controller 112 can be used to determine which relay method should be used based on measured parameters 114. For example, in an embodiment, the presence of adjacent channel interference requires the CF method. The CF method makes use of Carson's bandwidth rule such that, for example, reducing message frequency content reduces total occupied bandwidth. Additionally peak frequency deviation can be modified to reduce total occupied bandwidth. In an embodiment, the CF method makes use of Carson's bandwidth rule such that, for example, reducing message frequency content reduces total occupied bandwidth. In an embodiment, low signal to noise ratio (SNR) requires the DF method. Finally, in an embodiment, if the conditions are optimal, then AF method is selected.

While controller 112 is shown outside of receiver 108 in FIG. 1, it should be understood that, in an embodiment, controller 112 can be integrated into receiver 108 in accordance with an embodiment of the present disclosure. In an embodiment, controller 112 can receive measured parameters 114, determine which relay method to use based on measured parameters 114, and send a signal (e.g., relay mode signal 116) indicating the relay method to use. In an embodiment, relay mode signal 116 can be sent to a switch 118 that indicates which relay module should be used to send date to transmitter 110.

In an embodiment, the measured parameters received by controller 112 include adjacent channel information 114a, signal to noise ratio (SNR) information 114b, and SNR threshold information 114c. In an embodiment, controller 112 can select a relay module 102, 104, or 106 to be used based on this information. Measured parameters 114 can be either be measured by controller 114, by a device coupled to controller 114 (e.g., receiver 108), and/or by another device.

In an embodiment, adjacent channel information 114a is generated by measuring adjacent channels (on relay and from nearby transmitters) for RF transmissions to determine if CF relay module 104 should be selected to reduce interference with adjacent channels. In an embodiment, SNR information 114b is generated by measuring SNR to determine if DF relay module 106 should be selected. In an embodiment, SNR threshold information 114c is generated by measuring remaining battery life and mission duration to determine if AF relay module 102 should be selected.

It should be understood that the components of the relay system of FIG. 1 can be implemented using hardware, software, or a combination of hardware or software. Further, it should be understood that the components of the relay system of FIG. 1 can be implemented on a single device or a combination of devices. For example, in an embodiment, AF Relay module 102, CF Relay module 104, DF Relay module 106, controller 116, receiver 108, and transmitter 110 are implemented on a single device (e.g., on a chip, using hardware circuitry components, and/or using software). Further, it should be understood that, in an embodiment, controller 112 can be implemented using hardware, software, and/or a combination of hardware and software. For example, in an embodiment, controller 112 includes a processor (or other circuitry) configured to select the relay module 102, 104, or 106 to be used and a memory (e.g., to store measured parameters 114).

Table 2 illustrates mapping the first two measurement parameter values to relay operating modes. For both low SNR and adjacent channel interference (ACI), ideally combining the CF and DF methods is best if possible. If not possible, then default to DF to ensure that the relay is able to perform its job under the challenged channel conditions:

TABLE 2

Measurement Parameters to Relay Operating Mode

| SNR | ACI on output frequency | Operating Mode |
|---|---|---|
| High SNR | none | AF |
| High SNR | ACI | CF |
| Low SNR | none | DF |
| Low SNR | ACI | DF (with or without CF) |

Table 3 is another table showing available relay methods and the optimal method selected based on minimizing power:

TABLE 3

Measurement Parameters to Relay Operating Mode

| Observed Channel Conditions | Available Relay Methods | Optimal Method Selected Based on Minimizing Power |
|---|---|---|
| High SNR, No ACI | AF, CF, DF | AF (lowest power) |
| High SNR with ACI | CF, DF | CF (lowest power) |
| Low SNR, No ACI | DF | DF |
| High SNR with ACI | DF | DF |

Although the selection methodology discussed above optimizes for lowest computational complexity and minimized power consumption, a selection methodology in accordance with an embodiment of the present disclosure can be modified to select the optimal relay method based on alternative requirements such as for example: RF Spectrum "Cost" and latency.

Figure 2:
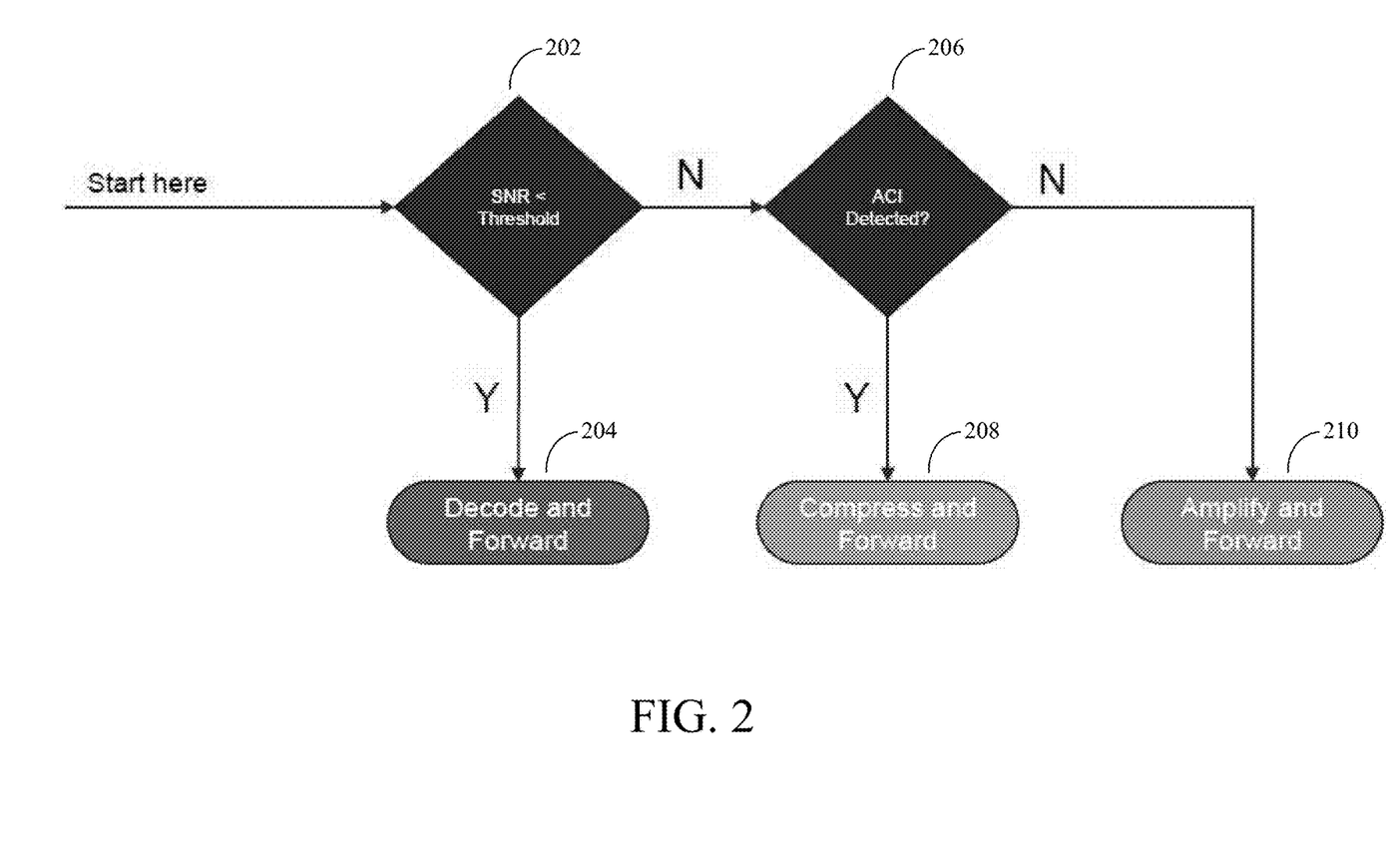
FIG. 2 is a flowchart of a method for selecting a relay method in accordance with an embodiment of the present disclosure.

FIG. 2 is a flowchart of an exemplary method for selecting a relay method in accordance with an embodiment of the present disclosure. In step 202, it is determined whether SNR is lower than a predetermined threshold value. For example, in an embodiment, controller 112 receives SNR information 114*b* and determines whether SNR information 114*b* indicates that SNR is below a predetermined threshold value indicating that SNR is low. If it is determined that SNR is below the threshold value, than the DF method is selected 204. For example, controller 112 can send relay mode signal 116 indicating that DF relay module 106 should be used to relay information.

In step 206, it is determined whether ACI is detected. For example, controller 112 can use ACI information 114*a* to determine whether ACI is detected. If it is determined that ACI is detected then the CF method is selected 208. For example, controller 112 can send relay mode signal 116 indicating that CF relay module 104 should be used to relay information. Otherwise, the AF method is selected 210. For example, controller 112 can send relay mode signal 116 indicating that AF relay module 102 should be used to relay information.

In an embodiment, measurements for SNR are performed by spectrum analyzer functionality (e.g., on receiver 108 and/or on controller 112) on the received signal limited to the bandwidth of the RF front end of the relay system. In an embodiment, the threshold for determining high SNR or low SNR in step 202 is dependent on the waveform's parameters. In an embodiment, the inputs for ACI can be set based on planned spectrum allocation and/or based on observing the bandwidth around the desired retransmission frequency. For example, in an embodiment, this can be performed with the same front end during periods of inactivity (e.g., no incoming signals on the uplink), or it can be performed by a separate front end. In essence, the relay system can be used as a spectrum analyzer.

5. Performance Comparison

Both the transmitter model and receiver model were implemented in MATLAB/Simulink and verified between the RT 1439A and the Avnet Zynq 7000 software defined radio platform. The models are step-based models, where each step processes a frame of IQ samples. On the receiver side, 3 different DFT computation methods were compared. Table 4 lists the run time comparison for the three different approaches. The FFT approach made use of the FFT magnitude model, which allowed it to run in the shortest amount of time. The other two methods (Goertzel and Sliding DFT) were implemented using Simulink blocks with an iterator block.

TABLE 4

MATLAB/Simulink squelch DFT run-time comparison for 1000 frame steps

| DFT Method | Measured Time to nearest ms | Compared to Fastest Approach |
|---|---|---|
| Goertzel | 75.503 seconds | 5.065 sec slower |
| Sliding DFT | 96.152 seconds | 25.714 sec slower |
| FFT | 70.438 seconds | — |

Afterwards the baseline relay models in MATLAB/Simulink were verified with two RT1439As and the Avnet Zynq 7000 SDR platform implementing each relay model separately. The computational times for the different baseline relay methods were measured by timing their respective MATLAB/Simulink models. The measured time for each model when run for 1000 frame steps is shown in Table 4. These results indicate that the AF relay method is the least computationally intensive method, the CF method is in the middle, and the DF method is the most computationally complex method.

TABLE 5

MATLAB/Simulink relay run-time comparison for 1000 frame steps

| Relay Method | Measured Time to nearest ms | Compared to Fastest Approach |
|---|---|---|
| AF | 8.150 seconds | — |
| CF | 1015.407 seconds | 1007.257 sec slower |
| DF | 1815.549 seconds | 1807.399 sec slower |

Figure 3:
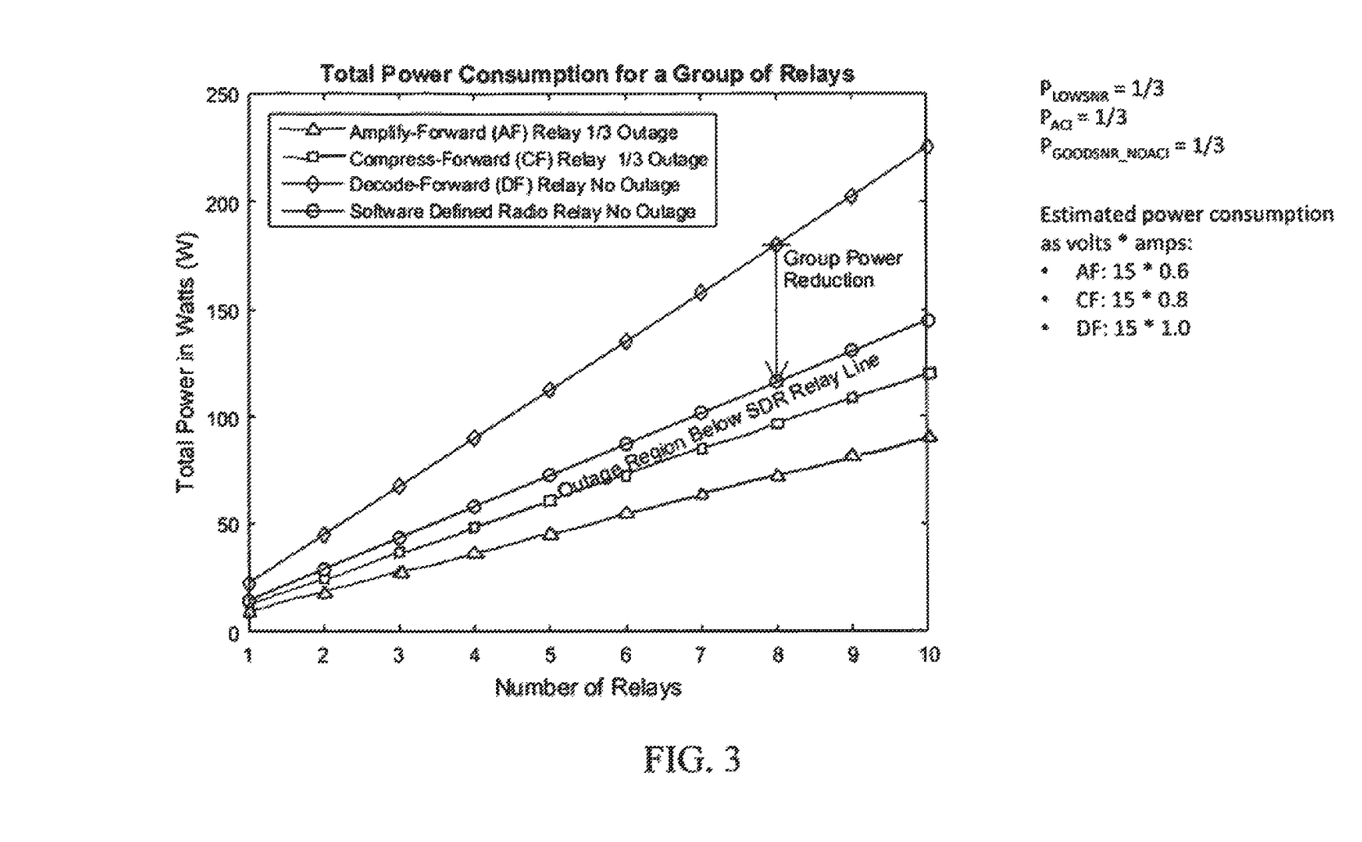
FIG. 3 is a diagram illustrating power savings that can be achieved by relay systems in accordance with embodiments of the present disclosure.

FIG. 3 is a diagram illustrating power savings that can be achieved by relay systems in accordance with embodiments of the present disclosure. Specifically, FIG. 3 illustrates the power savings which can be achieved by using software defined radio relays over fixed decode-and-forward relays for a group of relays with for example a fixed probability of 33% low signal to noise ratio (SNR), 33% adjacent channel interference, and the remaining 33% operating without impairments. Note that while AF and CF modes achieve lower total power, they exhibit outage 33% of the time, where they are unable to assist with relaying a transmission due to their inability to operate in low signal to noise ratio conditions. Total power was measured based on number of transmissions and operating mode of the relays with percentages assigned to the different operating modes. If neglecting overhead for the radio relay, this method is expected to achieve power savings over the DF relay mode for all cases except the case where the probability of low SNR is 100 percent. For the 100 percent case, it would have the same power requirement as the DF mode.

As shown above, systems and methods in accordance with embodiments of the present disclosure dynamically adjust relay methodology based on current radio frequency channel conditions by selecting an optimal relay method. The selection methodology does not require a handshake between users to agree upon a mode like IP based radios do. Systems and methods in accordance with embodiments of the present disclosure save power over traditional DF relays designed for worst case operations and do not require type 1 cryptography.

As shown above, radio relay systems that can dynamically adapt their relay modes in accordance with embodiments of the present disclosure can achieve useful power savings over conventional relay systems. Thus, they can support longer mission durations. Specific advantages of relay systems in accordance with embodiments of the present disclosure include lower power consumption (e.g., measurable 7.5 watt power savings per relay if dynamic switching enables ⅓ time in CF mode, and ⅓ time in AF mode), fewer outages, longer mission duration due to power savings, and ability to adapt to observed adjacent channel interference through bandwidth compression.

6. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A radio relay system, comprising:
an amplify and forward (AF) relay module coupled to a transmitter;
a compress and forward (CF) relay module coupled to the transmitter;
a decode and forward (DF) relay module coupled to the transmitter; and
a controller, coupled to the transmitter, configured to:
determine a signal-to-noise ratio (SNR) threshold based on remaining power of the radio relay system,
receive a SNR parameter corresponding to measured SNR information, and
select the AF relay module, the CF relay module, or the DF relay module to be used to relay information to the transmitter, wherein the controller is configured to select the DF relay module to be used to relay information to the transmitter in response to determining that the SNR parameter is below the SNR threshold, wherein the controller is further configured to select the AF relay module, the CF relay module, or the DF relay module based on size, weight, and power (SWAP) requirements of the radio relay system.

2. The radio relay system of claim 1, wherein the controller is further configured to:
receive a plurality of environmental parameters including the SNR parameter and an adjacent channel interference (ACI) parameter; and
select, based on the plurality of environmental parameters, the AF relay module, the CF relay module, or the DF relay module to be used to relay information to the transmitter.

3. The radio relay system of claim 2, wherein the controller is further configured to:
determine whether the ACI parameter indicates that ACI is detected; and select the CF relay module to be used to relay information to the transmitter in response to determining that ACI is detected.

4. The radio relay system of claim 2, wherein the controller is further configured to:
determine whether the ACI parameter indicates that ACI is detected; and
select the AF relay module to be used to relay information to the transmitter in response to determining that ACI is not detected and that the SNR parameter is not below the SNR threshold.

5. The radio relay system of claim 1, further comprising:
a receiver coupled to the AF relay module, the CF relay module, and the DF relay module; and
a switch coupled to an output of the controller and to an input of the transmitter.

6. The radio relay system of claim 5, wherein the controller is further configured to send a relay mode signal to the switch to select the AF relay module, the CF relay module, or the DF relay module to be used to relay information to the transmitter.

7. The radio relay system of claim 1, further comprising:
a second DF relay module coupled to the transmitter.

8. The radio relay system of claim 1, wherein the controller is further configured to determine the SNR threshold based on a duration of a task to be performed by the radio relay system.

9. The radio relay system of claim 1, wherein the controller is further configured to determine the SNR threshold based on a mission duration.

10. The radio relay system of claim 1, wherein the CF relay module is configured to reduce message frequency content such that total occupied bandwidth is reduced.

11. The radio relay system of claim 1, wherein the controller is further configured to measure SNR to determine the SNR parameter.

12. The radio relay system of claim 1, wherein the controller is further configured to periodically change the SNR threshold based on changing power of the radio relay system.

13. The radio relay system of claim 1, wherein the controller is further configured to dynamically adapt its relay mode to increase mission duration.

14. A controller for a radio relay system, the controller comprising:
a memory; and
a processor configured to:
determine a signal-to-noise ratio (SNR) threshold based on remaining power of the radio relay system,
receive a SNR parameter, corresponding to measured SNR information, and an adjacent channel interference (ACI) parameter,
determine whether the SNR parameter is below the SNR threshold,
select a decode and forward (DF) relay method to be used to relay information to a transmitter in response to determining that the SNR parameter is below the SNR threshold,
determine whether the ACI parameter indicates that ACI is detected,
select a compress and forward (CF) relay method to be used to relay information to the transmitter in response to determining that ACI is detected, and
select an amplify and forward (AF) relay method to be used to relay information to the transmitter in response to determining that ACI is not detected and that the SNR parameter is not below the SNR threshold,
wherein the processor is further configured to select the AF relay method, the CF relay method, or the DF relay method based on size, weight, and power (SWAP) requirements of the radio relay system.

15. The controller of claim 14, wherein the controller is further configured to generate a relay mode signal indicating whether the DF, CF, or AF relay method is to be used to relay information to the transmitter.

16. The controller of claim 14, further comprising:
a receiver coupled to the controller; and
a switch coupled to an output of the controller and to an input of the transmitter.

17. The controller of claim 16, wherein the controller is further configured to send a relay mode signal to the switch to select the AF relay method, the CF relay method, or the DF relay method to be used to relay information to the transmitter.

18. A method, comprising:
determining, using a controller device, a signal-to-noise ratio (SNR) threshold based on remaining power of a radio relay system;
receiving, using the controller device, a SNR parameter, corresponding to measured SNR information, and an adjacent channel interference (ACI) parameter;
determining, using the controller device, whether the SNR parameter is below the SNR threshold;
selecting, using the controller device, a decode and forward (DF) relay method to be used to relay information to a transmitter in response to determining that the SNR parameter is below the SNR threshold;
determining, using the controller device, whether the ACI parameter indicates that ACI is detected;
selecting, using the controller device, a compress and forward (CF) relay method to be used to relay information to the transmitter in response to determining that ACI is detected; and
selecting, using the controller device, an amplify and forward (AF) relay method to be used to relay information to the transmitter in response to determining that ACI is not detected and that the SNR parameter is not below the SNR threshold,
wherein the controller device is further configured to select the AF relay method, the CF relay method, or the DF relay method based on size, weight, and power (SWAP) requirements of the radio relay system.

* * * * *